United States Patent
Strutz et al.

(10) Patent No.: US 6,621,619 B2
(45) Date of Patent: Sep. 16, 2003

(54) HYBRID BRILLOUIN/ERBIUM DOPED FIBER AMPLIFIER APPARATUS AND METHOD

(75) Inventors: Shane J. Strutz, Columbia, MD (US); Keith J. Williams, Dunkirk, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/916,498

(22) Filed: Jul. 30, 2001

(65) Prior Publication Data

US 2003/0142392 A1 Jul. 31, 2003

(51) Int. Cl.[7] .............................. H01S 3/108; H01S 3/30
(52) U.S. Cl. ........................ 359/334; 359/333; 359/337
(58) Field of Search ................................. 359/333, 334, 359/337, 180, 181, 183, 188; 372/6

(56) References Cited

U.S. PATENT DOCUMENTS

| | | | | | |
|---|---|---|---|---|---|
| 4,469,397 A | * | 9/1984 | Shaw et al. | ..................... | 385/11 |
| 4,530,097 A | * | 7/1985 | Stokes et al. | ................ | 356/461 |

(List continued on next page.)

FOREIGN PATENT DOCUMENTS

| | | | | |
|---|---|---|---|---|
| EP | 504834 A2 | * | 9/1992 | ............ H04B/10/18 |
| EP | 633672 A1 | * | 1/1995 | ......... H04B/10/155 |
| JP | 01112830 A | * | 5/1989 | ............. H04B/9/00 |
| JP | 02040632 A | * | 2/1990 | ............. G02F/1/35 |
| JP | 06252518 A | * | 9/1994 | ............. H01S/3/30 |
| JP | 09053998 A | * | 2/1997 | ............. G01L/1/00 |
| JP | 11017619 A | * | 1/1999 | ......... H04B/10/152 |
| JP | 11055195 A | * | 2/1999 | ............ H04B/10/28 |

OTHER PUBLICATIONS

Yao et al. OFCC 2000 vol. 4, Mar. 7–10, 2000.*
Lee et al. IEEE Phot. Tech. Letts. vol. 12 No. 6, Jun. 2000.*
Yamashita et al. IEEE Phot. Tech. Letts, vol. 10 No. 6, Jun. 1998.*
Dennis et al. Elec. Letts. vol. 36, No. 22, Oct. 26, 2000.*
Boyd et al. J. of Light. Tech. vol. 17, No. 10, Oct. 1999.*
Williams et al. Elec. Letts. vol. 30, No. 23, Nov. 10, 1994.*
Abd–Rahman et al. Tencon 2000, vol. 3, Sep. 24–27, 2000.*
Park et al. OFCC 2000, vol. 3, Mar. 7–10, 2000.*
Izumita et al. OFC '97, Feb. 16–21, 1997.*
Esman et al. OFC '96, Feb. 25–Mar. 1, 1996.*
WO 99/22204 Stepanov et al. May 6, 1996.*

*Primary Examiner*—Thomas C. Black
*Assistant Examiner*—Stephen Cunningham
(74) *Attorney, Agent, or Firm*—Lawrence G. Legg; John J. Karasek

(57) ABSTRACT

A method and apparatus to enable the use of low cost high RIN optical sources for microwave photonic links by combining the wide-gain bandwidth and low cost of an EDFA, with the narrow gain bandwidth of a Brillouin amplifier. The hybrid Brillouin/EDFA ("hybrid amplifier") apparatus of the present invention includes at least two couplers, a phase modulator, an Erbium-doped fiber, a laser source to pump the Erbium fiber, an optical circulator, and a length of fiber used for Brillouin amplification. Optical signals from the laser source are split into two optical paths by a polarization maintaining coupler. Optical signals passing through a first path are amplified by the Erbium doped fiber, and the amplified signals are passed through the optical circulator before sending the optical signals into one end of a spool of fiber in order to pump the Brillouin acoustic wave. Optical signals that follow a second path are phase modulated in a phase modulator at the Brillouin frequency and injected into an opposite end of the fiber spool in order to seed the Brillouin amplifier and improve its low frequency stability. The output of the Brillouin section of the hybrid amplifier is directed through the optical circulator, and the output may be used as an optical source for a photonic link.

34 Claims, 8 Drawing Sheets

U.S. PATENT DOCUMENTS

| | | | | |
|---|---|---|---|---|
| 4,637,025 A | * | 1/1987 | Snitzer et al. | 372/1 |
| 4,958,908 A | * | 9/1990 | Rockwell et al. | 359/285 |
| 5,166,821 A | | 11/1992 | Huber | |
| 5,315,426 A | * | 5/1994 | Aoki | 359/160 |
| 5,359,450 A | | 10/1994 | Ramachandran et al. | |
| 5,537,671 A | * | 7/1996 | Toyama et al. | 356/461 |
| 5,548,436 A | | 8/1996 | Ramachandran et al. | |
| 5,598,289 A | * | 1/1997 | Watanabe | 359/134 |
| 5,619,368 A | * | 4/1997 | Swanson | 359/326 |
| 5,671,075 A | | 9/1997 | Ramachandran et al. | |
| 5,673,280 A | | 9/1997 | Grubb et al. | |
| 5,798,853 A | * | 8/1998 | Watanabe | 359/160 |
| H1791 H | * | 3/1999 | Williams | 359/25 |
| 5,880,463 A | * | 3/1999 | Uchiyama | 250/227.14 |
| 5,917,179 A | * | 6/1999 | Yao | 250/205 |
| 5,930,024 A | | 7/1999 | Atlas | |
| 6,252,693 B1 | * | 6/2001 | Blauvelt | 359/161 |
| 6,330,089 B1 | * | 12/2001 | Yamada | 359/115 |
| 6,335,819 B1 | * | 1/2002 | Cho et al. | 359/176 |
| 6,339,495 B1 | * | 1/2002 | Cowle et al. | 359/174 |
| 6,347,174 B1 | * | 2/2002 | Onishi et al. | 359/326 |
| 6,417,956 B1 | * | 7/2002 | Pedersen | 359/334 |
| 6,417,957 B1 | * | 7/2002 | Yao | 250/227.11 |
| 2001/0024317 A1 | * | 9/2001 | Yao | 359/334 |
| 2001/0030796 A1 | * | 10/2001 | Yao | 359/334 |

* cited by examiner

HYBRID BRILLOUIN/ERBIUM DOPED FIBER AMPLIFIER APPARATUS AND METHOD

FIELD OF THE INVENTION

The present invention relates to fiber optic transmission systems. More particularly, it relates to an apparatus and method for improving light amplification and noise figure in fiber optic links by using a high-output-power, low relative intensity noise (RIN) optical sources.

BACKGROUND OF THE INVENTION

Analog photonic links are attractive for remote distribution of optical signals (referred to as "optical remoting") and control of phased array antenna systems due to their low-loss, large intrinsic bandwidth, and immunity to electromagnetic interference. These characteristics of fiber optic links make them desirable for communicating information at RF frequencies including making them as valuable tools for remoting antennas. Photonic links between remote antennas and control stations may be used to remote local oscillator signals or to use RF signals transmitted from an antenna to a remote centralized location. The complexity of the signals received from the remote antennas requires efficiently relaying the information while processing it.

Although analog photonic links may be used as signal processing tools, the complexity of the received RF signals when combined with the dynamic range requirements of antennas imposes strain on the noise figure requirements of photonic links. For example, a typical photonic link composed of a 30 mW DFB laser, a 5 Volt $V_\pi$ MZM, and a photodetector, as illustrated in FIG. 1, may have a RF noise figure of greater than 30 dB with no microwave preamplifier circuitry.

The RF noise figure may deteriorate when laser sources with a high relative intensity noise(RIN) are used in photonic links. Although using high power solid state lasers enable shot-noise-limited photocurrents, and may reduce the noise figure, this approach may be economically prohibitive, thus making high-power shot-noise-limited microwave links uneconomical.

In one approach, Erbium Doped Fiber Amplifiers (EDFAs) are used as in-line amplifiers in fiber transmission systems because of their wide bandwidth and low noise figure. These amplifiers are typically distributed throughout a transmission system in order to maintain high optical power while minimizing signal-to-noise ratio degradation. EDFAs, however, generate amplified spontaneous (ASE) noise, which limits a system's electrical signal-to-noise ratio through spontaneous-to-spontaneous and signal-spontaneous beat noise at a receiver, which may typically be a photodetector. Because of the wide bandwidth of EDFAs, the ASE may extend well past 1 THz. The beat noise resulting from ASE leads to a large RF noise figure, thus limiting their use in microwave photonic links.

Brillouin amplifiers use stimulated Brillouin scattering to produce large gains over a narrow bandwidth. Brillouin scattering is the inelastic interaction of light with acoustic phonons that result in a shift in frequency of the scattered radiation. This effect is similar to Raman scattering, but information is obtained about acoustic branches of the phonon spectrum. It results from statistical density fluctuations due to acoustical vibrations in the scattering medium. These fluctuations travel at the local speed of sound and the frequency of the scattered light is Doppler-Shifted. The relative velocity of the density fluctuation waves depends on the angle of observation, ranging from the speed of light to zero. Therefore the amount of the frequency shift also varies with the angle of observation.

Stimulated Brillouin Scattering (SBS) is a highly efficient mechanism for producing large gains (>30 dB) over a very narrow bandwidth (<30 MHz). Considering an electrorestrictive material where acoustic noise is due to the Bownian motion of its molecules (thermal noise), SBS occurs via interaction of an incident light wave (pump beam), an acoustic wave, and the backscattered (Stokes) lightwave. The backscattered light (Stokes light) propagates in a direction opposite to the pump light/beam to interfere with the pump beam. When two lightwaves of different optical frequencies counter-propagate in the same electrorestrictive material, their superposition yields interference fringes, creating zones of high electrical field intensity and zones of weaker field intensity. Due to electrorestriction, periodical compression zones moving at the speed given by the optical frequency difference are induced in the material. If this speed corresponds to the speed of sound in the material, an acoustic wave is created. Thus, due to the electrorestriction, an acoustic wave is generated that stimulates the Brillouin scattering even more, thereby reinforcing the acoustic wave.

The backscattered light wave (Stokes light) is shifted by the acoustic photon frequency of the optical fiber, or the Brillouin frequency. In optical fibers, a significant portion of the optical power traveling through the fiber is converted into the Stokes wave traveling in the opposite direction to the pump beam. Although fiber based Brillouin amplifiers have a narrow gain bandwidth, the baseband noise in the Stokes light may include strong frequency components to the order of 1 GHz, thus impairing their performance in microwave photonic applications where an amplifier is used for amplifying signal information.

Thus, there is a need to overcome the problems encountered by the prior art by enabling the use of low cost high RIN optical sources for microwave photonic links.

SUMMARY OF THE INVENTION

Accordingly, the present invention provides an exemplary method and apparatus in order to enable the use of low-cost high RIN optical sources for microwave photonic links by combining the widegain-bandwidth of an EDFA with the narrow gain-bandwidth of a Brillouin amplifier to produce an inexpensive light source for photonic links. The Brillouin gain is preferably used as a carrier amplifier for the present invention.

The exemplary hybrid Brillouin/EDFA ("hybrid amplifier") apparatus of the present invention includes at least two couplers, a phase modulator, an Erbium-doped fiber, a laser source to pump the Erbium fiber, an optical circulator, and a length of fiber used for Brillouin amplification. Optical signals from the laser source are split into two optical paths by a polarization maintaining coupler, such as, for example, a 3 dB coupler. Optical signals passing through a first path are amplified by the Erbium doped fiber, and the amplified signals are passed through the optical circulator before passing the optical signals into one end of a spool of optical fiber to pump the Brillouin acoustic wave created in the optical fiber. Optical signals that follow a second path are phase modulated in a phase modulator, such as, for example, a $LiN_bO_3$ phase modulator, at the Brillouin frequency and injected into an opposite end of the optical fiber spool to provide input ("seed") to the Brillouin amplifier and improve its low frequency stability. The output of the Brillouin section of the hybrid amplifier is directed through the optical circulator, and the output from the circulator may be used as an optical source for a photonic link.

The present invention also provides a method for improving the noise figure, dynamic range, and loss in fiber optic links. In addition, the present invention enables inexpensive, high RIN sources to be used in analog photonic links.

In one embodiment, the present invention comprises a hybrid amplifier with a DFB laser as a pump with a photodetector attached to the output of the hybrid amplifier.

Still other objects and advantages of the present invention will become apparent to those skilled in the art from the following detailed description, wherein only the preferred embodiment of the invention is shown and described, simply by way of illustration of the best mode contemplated of carrying out the invention. As will be realized, the invention is capable of different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

A more complete understanding of the present invention may be had by reference to the following Detailed Description when taken in conjunction with the accompanying drawings wherein.

In the drawings, like or similar elements are designated with identical reference numerals throughout the drawings, and the various elements depicted are not necessarily drawn to scale.

DETAILED DESCRIPTION OF THE INVENTION

Figure 1:
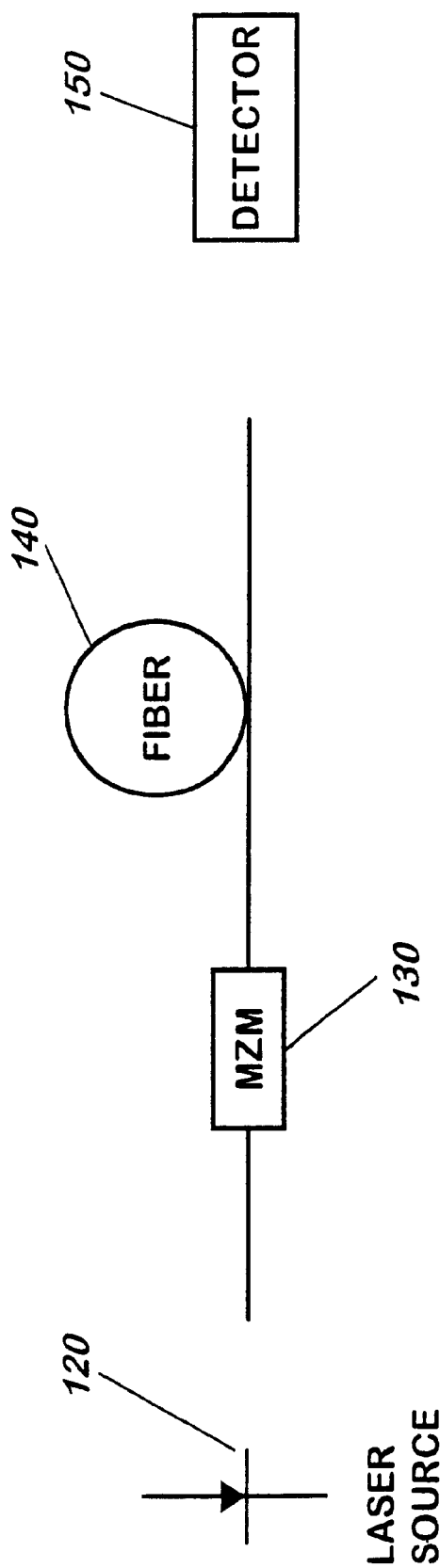
FIG. 1 illustrates a typical photonic link.

FIG. 1 shows a typical photonic link wherein a continuous wave optical signal from a source 120 is received by a Mach Zender Modulator (MZM) 130. The modulated light is received in an optical fiber 140, and the output from the optical fiber is detected in a photodetector 150.

Figure 2:
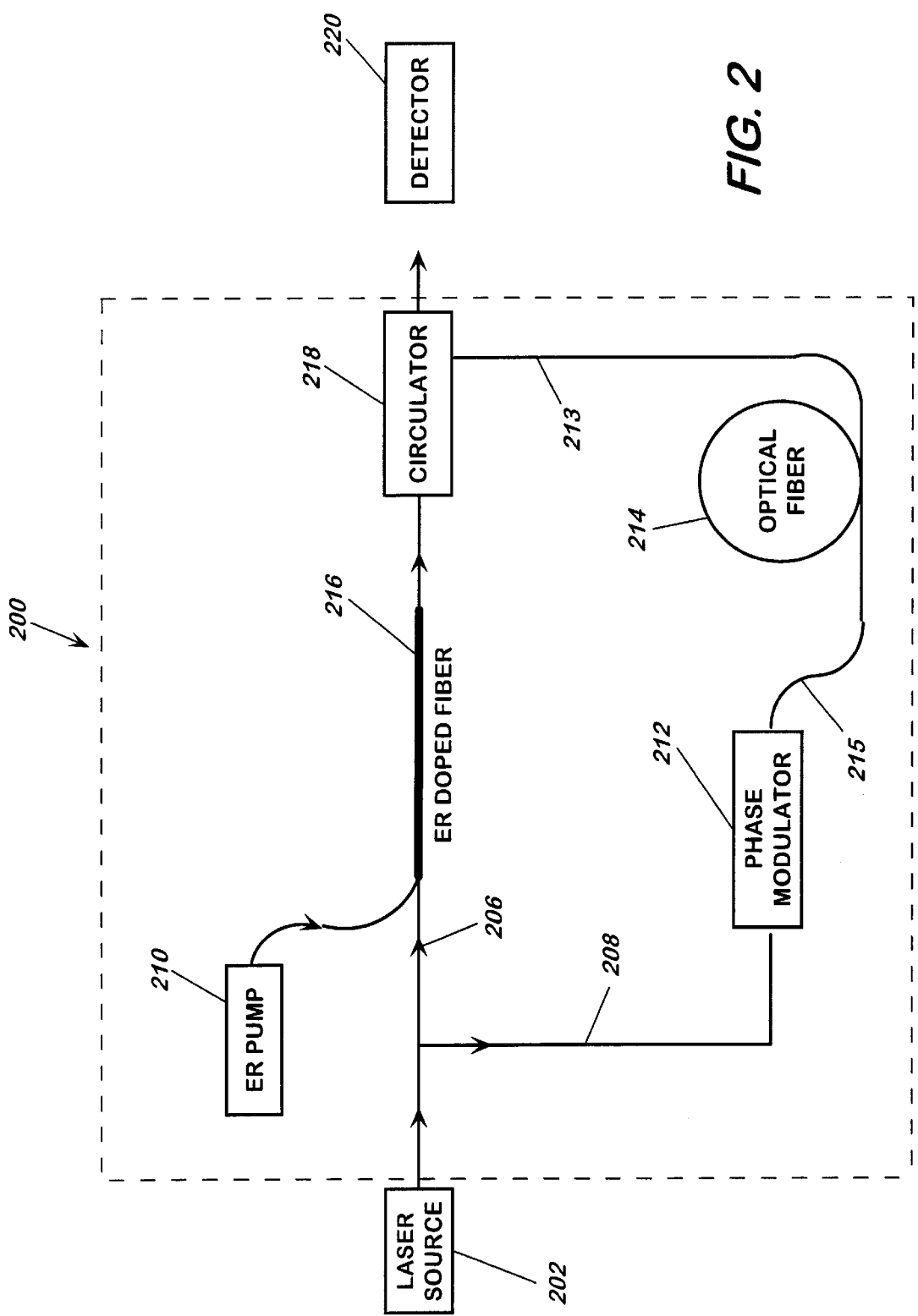
FIG. 2 shows an exemplary schematic disclosing the details of an exemplary hybrid amplifier in accordance with the present invention.

FIG. 2 shows a schematic disclosing the details of an exemplary hybrid Brillouin/Erbium fiber amplifier ("hybrid amplifier") 200 in accordance with the present invention. Light from an optical source 202 are received in first and second optical paths 206, 208, respectively. Light passing through the first path 206 is amplified in an Erbium doped fiber 216. An Erbium pump 210 provides seed to pump optical signals in the first path, the optical signals being received in the Erbium doped fiber 216. Light amplified in Erbium doped fiber 216 is then passed through an optical circulator 218 prior to forwarding the light into one end 213 of a spool of fiber 214 to pump the Brillouin acoustic wave created in the fiber spool 214, the fiber spool being used for Brillouin amplification.

Light following the second path 208 is phase modulated at the Brillouin frequency and injected into the opposite end 215 of the fiber spool 214. Phase modulated optical signals from second path 206 are used to seed the Brillouin amplifier created in the fiber spool 214 in order to improve the Brillouin amplifier's low frequency stability. The output of the Brillouin section of amplifier 200 is directed through an optical circulator 218 for use as an optical source for a photonic link. The output from circulator 218 is detected by a photodetector 220.

Figure 3:
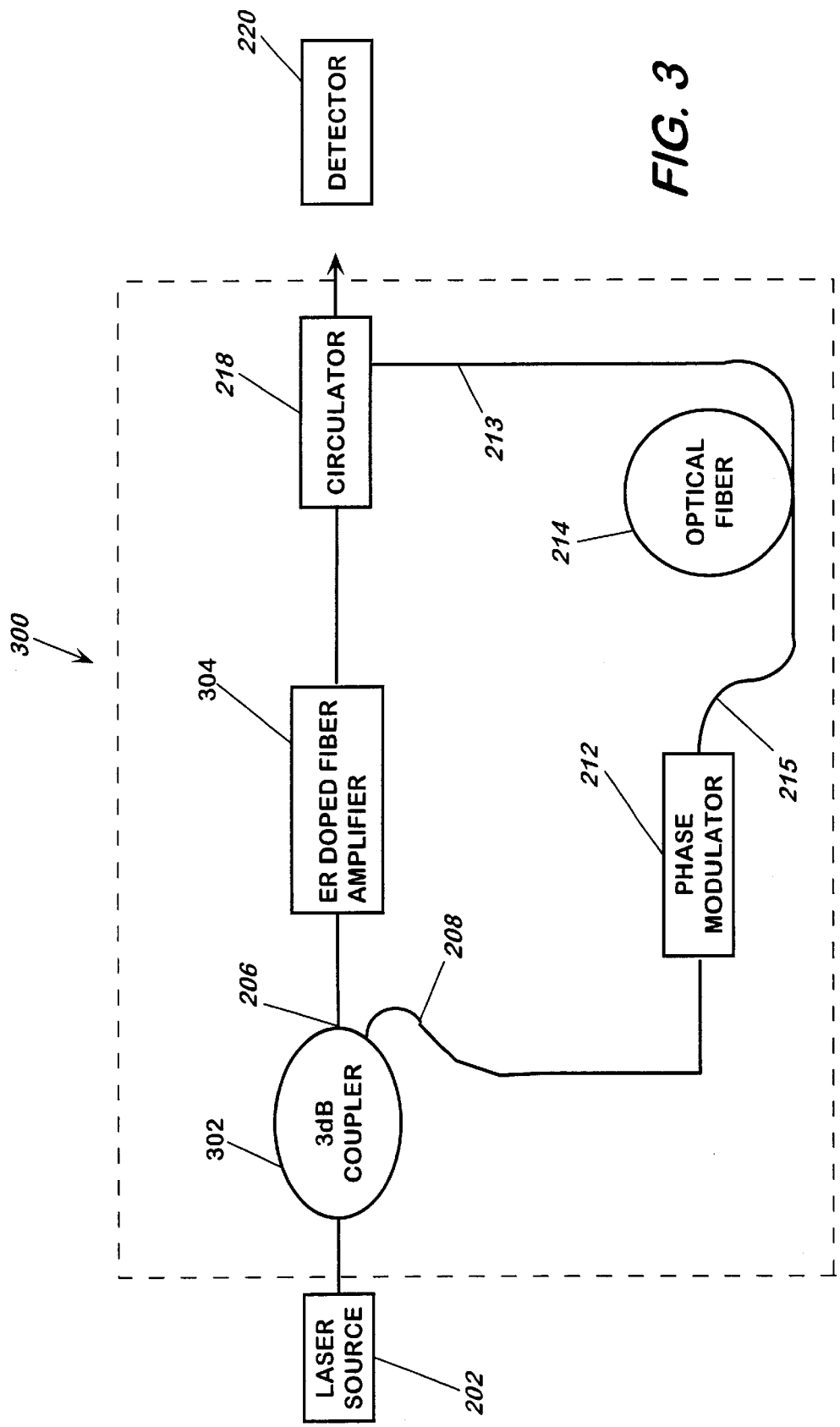
FIG. 3 shows another exemplary embodiment of the present invention as shown in FIG. 2.

FIG. 3 shows an exemplary schematic illustrating an experimental configuration of the present invention as shown in FIG. 2. Here, the Brillouin amplifier/EDFA ("hybrid amplifier") is generally shown at 300. Optical signals from a laser source 202 are split by a coupler 302 into first and second optical paths 206, 208, respectively. Optical signals in the first path 206 are amplified by an Erbium doped fiber amplifier (EDFA) 304, and the amplified signals are passed through circulator 218, and subsequently, into one end of an optical fiber spool 214 to pump the Brillouin acoustic wave created therein. The optical fiber 214 may be, for example, a single mode fiber, such as SFM-28. Light from the second path 208 is passed through a phase modulator 212 where it is modulated at the Brillouin frequency, for example, at 10.8 GHz, and the modulated light is supplied to the other end of fiber 214 as a signal input to the Brillouin amplifier. The combined effect of the two paths (206, 208) is that light from EDFA 304 generates an acoustic wave in fiber spool 214. The acoustic wave creates a scattered light wave (Stokes wave). The scattered light wave amplifies the signals entering from the opposite end 215 of the fiber spool 214. The amplified light is passed through circulator 218 before the output of the Brillouin section of the amplifier is detected by the photodetector 220. The output noise of the hybrid amplifier 300 is characterized with the photodetector 220.

Figure 4:
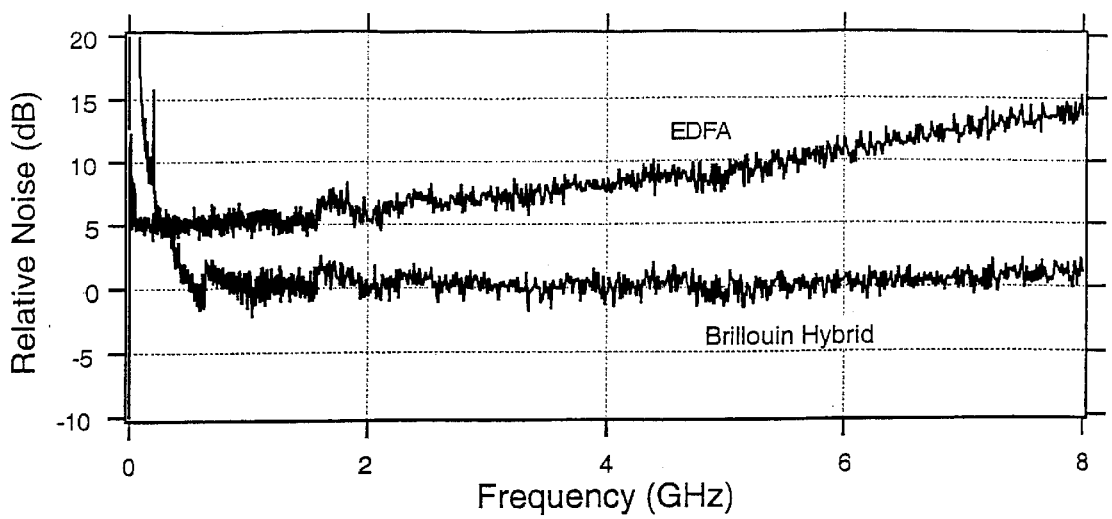
FIG. 4 shows an exemplary graphical chart comparing the performance of the hybrid amplifier in accordance with the present invention to a typical photonic link.

Referring to FIG. 4, there is shown an exemplary graphical chart comparing the performance of the hybrid amplifier 300 of the present invention to typical EDFA amplified photonic link. Specifically, FIG. 4 shows an exemplary graphical chart comparing the output noise power of the hybrid amplifier and the EDFA amplified links relative to the shot-noise limited Nd:YAG laser link. At photocurrent of 10 mA, the EDFA amplified link was as high as 15 DB above the shot-noise limit. Implementing the hybrid amplifier (FIG. 3) caused the link-noise to decrease to the shot-noise level. The noise reduction may be due to the narrow gain bandwidth, for example, less than 30 MHz, of Brillouin amplification in the optical fiber spool 214. As a result, a portion of the spontaneous emission from the EDFA 304 was filtered out of the optical beam. The reduced ASE noise for frequencies greater than 500 MHz from the carrier decreases signal-spontaneous beat noise at the photodetector 220 (FIG.

3). As graphically illustrated, this is a significant improvement over the noise performance of the EDFA amplified link.

Figure 5:
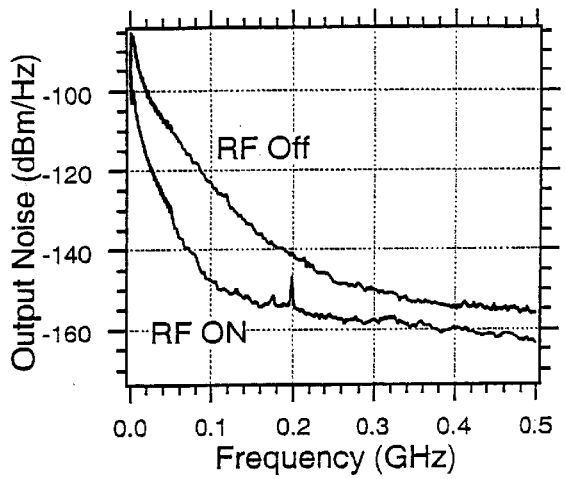
FIG. 5 shows an exemplary graphical chart illustrating the effect of added phase modulator versus no modulation signal in the hybrid amplifier in accordance with an example embodiment of the present invention.

FIG. 5 shows an exemplary graphical chart illustrating the effect of added phase modulator 212 (FIG. 3) versus no modulation signal in the hybrid amplifier 300 in accordance with an example embodiment of the present invention as shows in FIG. 3. As shown in FIG. 5, injecting a phase modulated signal beam into the Brillouin amplifier section of fiber spool 214 (FIG. 3) of the hybrid amplifier 300 caused an overall reduction in the noise of the hybrid amplifier 300 for frequencies below 500 MHz. In addition to the noise reduction below 500 MHz, hybrid amplifier 300 also showed a reduction in the burst noise caused by the Brillouin amplifier, while trace to trace variations in the analyzed spectrum were eliminated.

Figure 6:
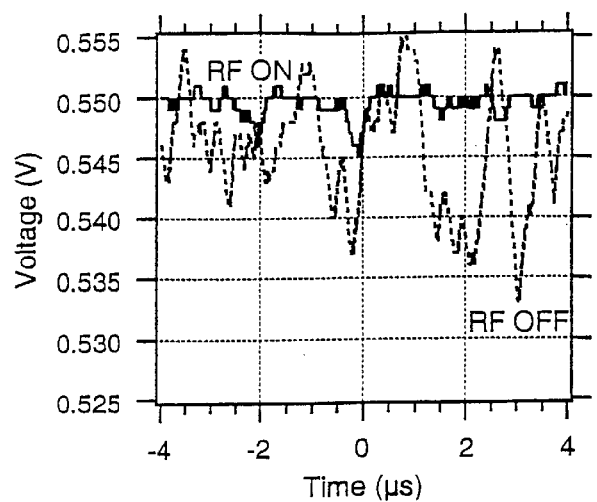
FIG. 6 shows an exemplary graphical chart illustrating the effect of RF modulation on the output of the hybrid amplifier in accordance with an example embodiment of the present invention.

FIG. 6 shows a graphical representation of the effect of RF modulation on the output of an optical link. The output of the hybrid amplifier 300 (FIG. 3) was monitored, with and without phase modulation, using a d.c. coupled photodetector 220. As illustrated in the graph, the d.c. output appears to be more stable with phase modulation of the Brillouin signal beam. The increased stability in the output indicates that inserting a phase-modulated seed signal into the Brillouin amplifier, created in the optical fiber spool 214, improves the overall performance of an optical link. The present invention thus provides a new method of achieving shot-noise limited performance from a 0.5 to 0.8 GHz analog photonic link, without having to resort to expensive solid state lasers.

Figure 7:
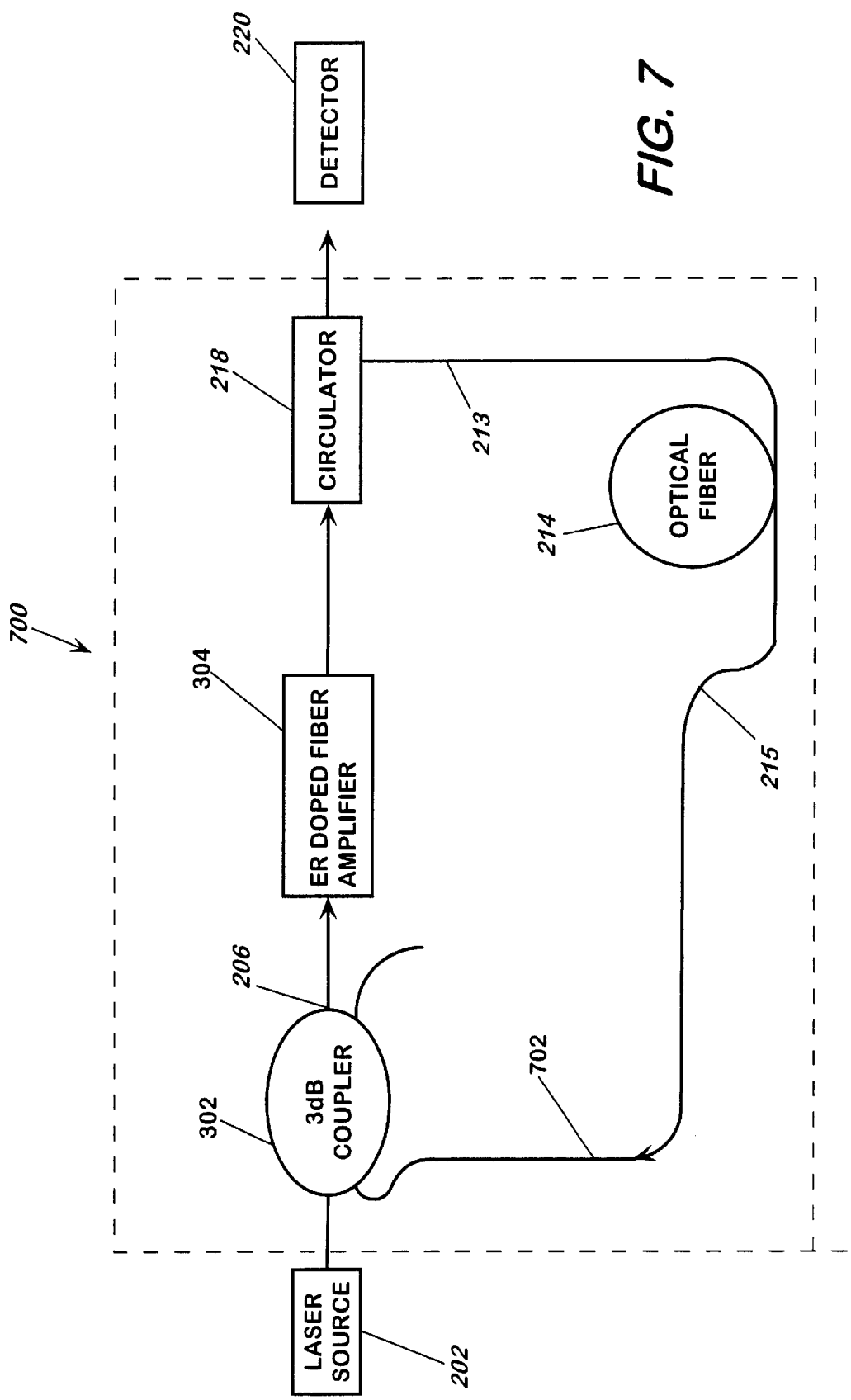
FIG. 7 shows another exemplary embodiment of the present invention as shown in FIG. 3.
Figure 7A:
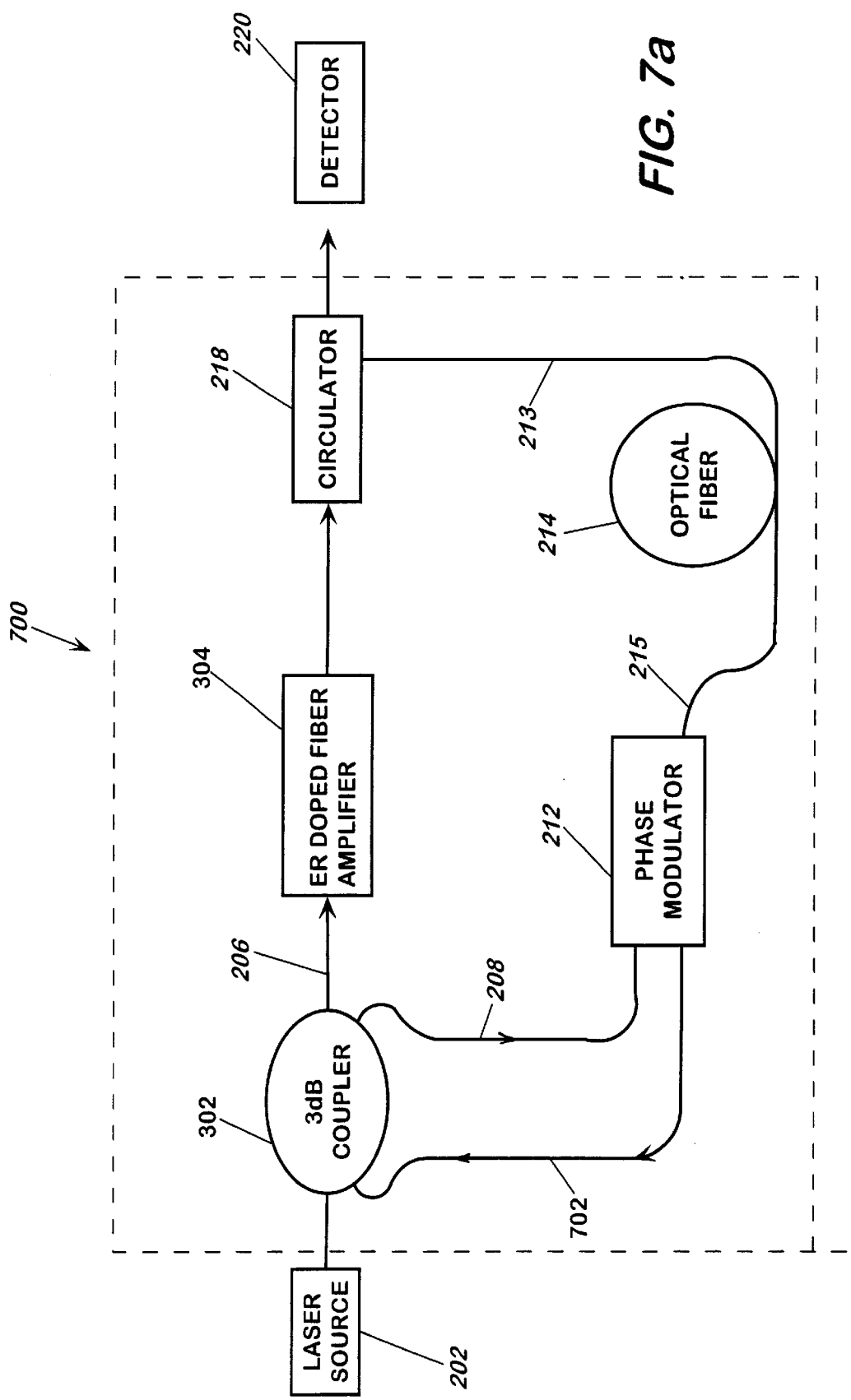
FIG. 7a shows another example embodiment of the present invention as shown in FIG. 7.

Referring now to FIG. 7, there is shown another embodiment of the present invention wherein hybrid amplifier 700 is provided with an optical feedback loop 702. In this approach, the feedback loop 702 is created so that the phase modulated light passing from the optical fiber spool 214 and then through the phase modulator 212 is fed back via feedback loop 702 into the EDFA 304. This approach increases the output power of the amplifier 700 while maintaining the low-RIN characteristics of the amplifier 700. FIG. 7a shows an exemplary embodiment of the present invention wherein hybrid amplifier 700 is provided with an optical feedback loop 702 for feeding back light from optical fiber spool 214 and phase modulator 212 back into the EDFA 304.

Figure 8:
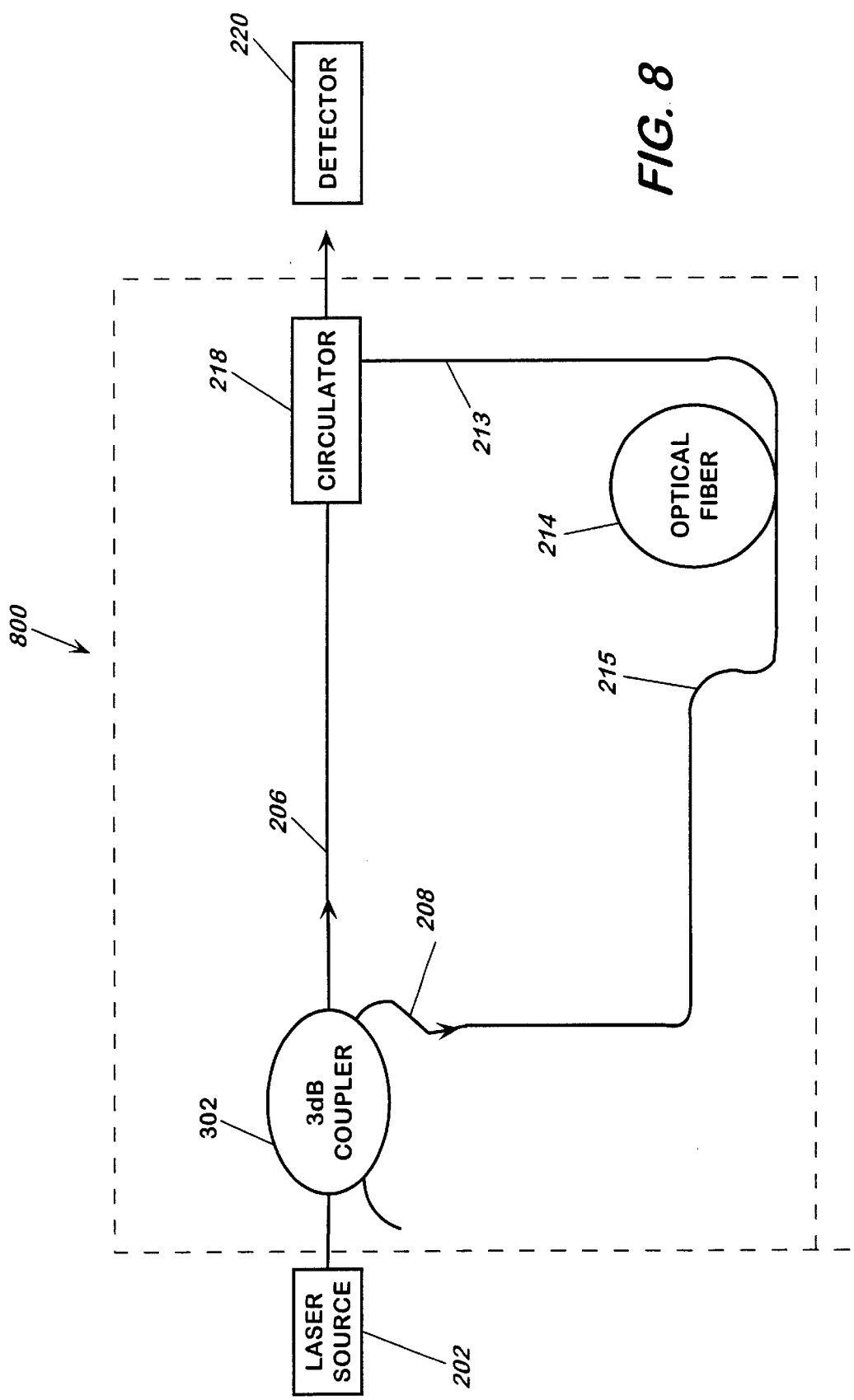
FIG. 8 shows yet another exemplary embodiment of the present invention as illustrated in FIG. 3.

FIG. 8 shows another exemplary embodiment of the present invention. In this embodiment, EDFA 304 (FIG. 7) is removed from amplifier 800, thus enabling the use of the amplifier 800 as a high-power laser noise filter. The amplifier 800 functions over a broad optical-bandwidth of the optical fiber, such as, for example, a silica fiber provided the laser 202 emits light at a power above the Brillouin threshold. A phase modulator may be included in link 208 located between the 3 dB coupler 302 and the fiber spool 214.

Figure 9:
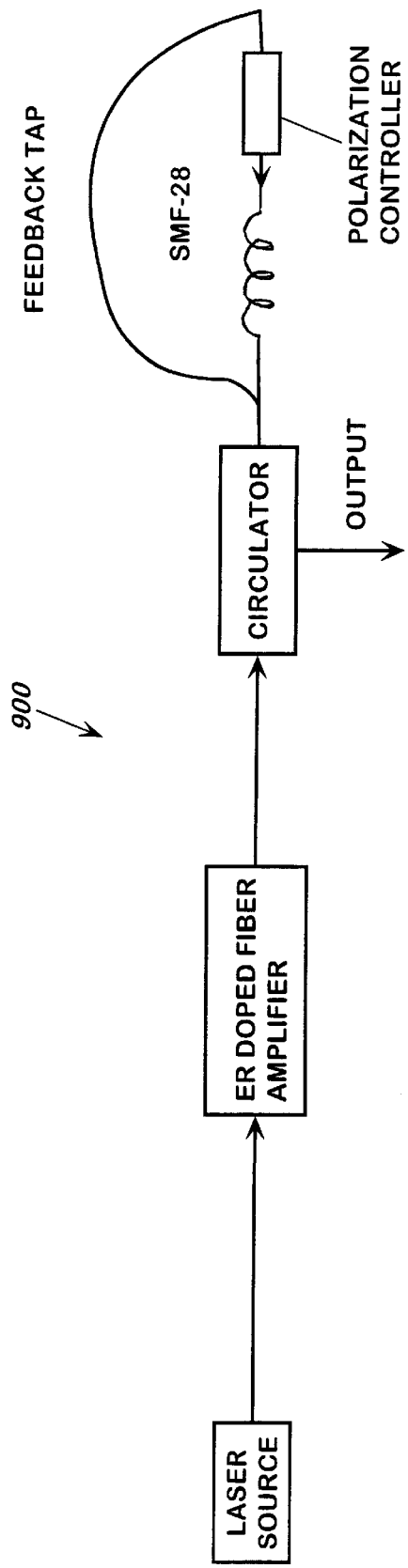
FIG. 9 shows yet another example embodiment of the present invention as shown in FIG. 7.

FIG. 9 shows another exemplary embodiment of the present invention. In this embodiment, a small portion of the Brillouin amplified light (seed) is injected into the opposite end of the fiber spool. The seed light has been wavelength shifted by the Brillouin amplification process and acts to stabilize the amplification process of amplifier 900. A phase modulator may be included in the feedback loop.

It is believed that the operation and construction of the present invention will be apparent from the foregoing Detailed Description. While the apparatus and method shown and described have been characterized as being preferred, it should be readily understood that various changes, modifications and enhancements could be made therein without departing from the scope of the present invention as set forth in the following claims.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. An apparatus for light amplification and noise reduction in fiber optical communication links, said apparatus comprising:

an erbium-doped fiber amplifier (EDFA) for amplifying light received in a first optical path from a light source;

a circulator receiving light from said EDFA and producing output signals, the output signals being fed into a first end of an optical fiber; and a phase modulator for modulating, at Brillouin shift frequency, light received in a second optical path from the light source wherein the phase modulator is externally driven, whereby light modulated by said phase modulator is fed into a second opposite end of the optical fiber in order to reduce noise and stabilize the output signals at the circulator.

2. The apparatus of claim 1, wherein said EDFA comprises an erbium pump.

3. The apparatus of claim 2, wherein said phase modulator comprises Lithium Niobate.

4. The apparatus of claim 3, wherein said optical fiber is a single mode optical fiber.

5. The apparatus of claim 4, wherein said phase modulator modulates optical signals at a frequency of about 10.8 GHz (Brillouin frequency).

6. The apparatus of claim 1, further comprises:

a 3 dB coupler for splitting input light from a laser source into said first and second optical paths.

7. The apparatus of claim 1, wherein said circulator is a fiber optic circulator, and said circulator in combination with the optical fiber is used for Brillouin amplification.

8. The apparatus of claim 7, wherein output signals from said EDFA are fed into the first end of the optical fiber to pump Brillouin acoustic wave.

9. The apparatus claim 8, wherein acoustic wave created by said EDFA produces a scattered light wave, the scattered light wave amplifying optical signals entering the second end of the optical fiber from said second optical path.

10. An apparatus as in claim 1, wherein said phase modulator is externally driven to collapse line width of the light source.

11. An apparatus for use in fiber optical transmission systems, said apparatus comprising:

a coherent light source;

an erbium-doped fiber amplifier (EDFA) for amplifying light received from the light source in a first optical path;

a phase modulator for modulating at Brillouin shift frequency light received from said light source in a second optical path, wherein said phase modulator is externally driven;

a circulator for receiving amplified optical signals from said EDFA;

an optical fiber for receiving optical signals at one end thereof from said circulator, an opposite end of said fiber receiving modulated optical signals from said phase modulator in order to stabilize output signals at the circulator, said optical fiber and said circulator being used for Brillouin amplification of optical signals; and a detector for detecting optical signals output from said circulator.

12. The apparatus of claim 11, wherein said EDFA comprises an erbium pump.

13. The apparatus of claim 12, wherein said phase modulator comprises Lithium Niobate.

14. The apparatus of claim 13, wherein said optical fiber is a single mode optical fiber.

15. The apparatus of claim 14, wherein said phase modulator modulates optical signals at a frequency of about 10.8 GHz (Brillouin frequency).

16. The apparatus of claim 15, further comprises:
a 3 dB coupler for splitting input light from a laser source into said first and second optical paths.

17. A method for modulating optical signals in analog photonic links, said method comprising:
amplifying light received in a first optical path from an optical source using an erbium-doped fiber amplifier (EDFA);
phase-modulating, at Brillouin shift frequency, light received in a second optical path from said optical source using a phase modulator, wherein the step of phase-modulating is externally driven;
receiving amplified optical signals from said EDFA in a circulator;
receiving amplified optical signals from said circulator into a first end of said optical fiber;
passing phase-modulated optical signals from said phase modulator into an opposite second end of said optical fiber in order to stabilize output signals at the circulator; and
detecting output signals from said circulator.

18. The method of claim 17, wherein said EDFA comprises an erbium pump.

19. The method of claim 17, wherein said phase modulator comprises Lithium Niobate.

20. The method of claim 17, wherein said optical fiber is a single mode optical fiber.

21. The method of claim 17, wherein said phase-modulating step is performed at a frequency of about 10.8 GHz (Brillouin frequency).

22. The method of claim 17, wherein optical signals from the optical source are split into first and second optical paths using a 3 dB coupler.

23. An apparatus for use in fiber optical transmission systems, said apparatus comprising:
a coherent laser source;
a coupler for receiving input light from the laser source and for splitting input light into first and second optical paths;
an erbium-doped fiber amplifier (EDFA) disposed in said first optical path, said EDFA for receiving input light from said coupler and amplifying the input light;
a fiber optic circulator for receiving said amplified input signals from said EDFA and for supplying output signals from one port of said circulator to a first end of an optical fiber; and
a phase modulator disposed in said second optical path for modulating, at Brillouin shift frequency, the input light prior to forwarding the input light into a second opposite end of the optical fiber in order to stabilize output signals at the circulator, the phase modulator being externally driven.

24. The apparatus of claim 23, further comprises:
a d.c. coupled photodetector for detecting optical signals output from said circulator; and
a feedback loop for supplying phase-modulated light passing from said optical fiber medium and through said phase modulator into the EDFA.

25. The apparatus of claim 23, wherein said phase modulator comprises Lithium Niobate.

26. The apparatus of claim 25, wherein said optical fiber is a single mode optical fiber.

27. The apparatus of claim 25, wherein said phase modulator modulates optical signals at a frequency of about 10.8 GHz (Brillouin frequency).

28. An apparatus as in claim 23, wherein said phase modulator is externally driven to collapse line width of the light source.

29. A method for light amplification and noise reduction in fiber optical communication links, said method comprising:
providing a coherent light source;
amplifying light received from the laser source in a first optical path by an erbium-doped fiber amplifier (EDFA);
receiving light from the EDFA in a circulator;
feeding output signals from said circulator into a first end of an optical fiber;
externally modulating, at Brillouin frequency, light received from the laser source in a second optical path using a phase modulator;
feeding the modulated light into an opposite second end of the optical fiber in order to stabilize output signals at the circulator; and
detecting the output of said circulator.

30. The method of claim 29 wherein said EDFA comprises an erbium pump.

31. The method of claim 30, wherein said phase modulator comprises Lithium Niobate.

32. The method of claim 31, wherein said optical fiber is a single mode optical fiber.

33. A hybrid amplifier for use in fiber optic communication links, said amplifier comprising:
a coherent laser source;
a erbium-doped fiber amplifier (EDFA) for amplifying optical signals;
a circulator in combination with an optical fiber used as a Brillouin amplifier; and
a phase modulator, for modulating light at Brillouin shift frequency, and also for providing seed input to the Brillouin amplifier and stabilizing output signals at the circulator, wherein said phase modulator is externally driven.

34. An apparatus for filtering noise in fiber optic communication links, said apparatus comprising:
a laser source;
an amplifier disposed in a first optical path, said amplifier for receiving light from said laser source;
a circulator for receiving light from said amplifier and for producing output signals, the output signals being fed into a first end of an optical fiber, a second opposite end of the fiber receiving light from said laser source, passed through a phase modulator, in a second optical path in order to stabilize output signals at the circulator, said phase modulator being externally driven; and
a detector for detecting output of said circulator.

* * * * *